United States Patent
Chang

(10) Patent No.: US 10,325,377 B2
(45) Date of Patent: Jun. 18, 2019

(54) IMAGE DEPTH SENSING METHOD AND IMAGE DEPTH SENSING APPARATUS

(71) Applicant: Wistron Corporation, New Taipei (TW)

(72) Inventor: Yao-Tsung Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/800,073

(22) Filed: Nov. 1, 2017

(65) Prior Publication Data

US 2019/0051005 A1    Feb. 14, 2019

(30) Foreign Application Priority Data

Aug. 10, 2017    (TW) .............................. 106127125 A

(51) Int. Cl.
*G06T 7/521*    (2017.01)
*H04N 13/25*    (2018.01)
(Continued)

(52) U.S. Cl.
CPC ......... *G06T 7/521* (2017.01); *H04N 5/23241* (2013.01); *H04N 5/23245* (2013.01);
(Continued)

(58) Field of Classification Search
CPC .............................. G06T 7/521; H04N 13/254; H04N 5/23241; H04N 5/23245; H04N 13/20; H04N 13/25; H04N 13/268
See application file for complete search history.

(56) References Cited

U.S. PATENT DOCUMENTS 7,852,461 B2 * 12/2010 Yahav .................. G01S 17/023
356/3.08
8,970,827 B2 * 3/2015 Bloom ............... G02B 26/0841
356/5.01
(Continued)

FOREIGN PATENT DOCUMENTS

CN    1414420    4/2003
TW    M423406    2/2012
(Continued)

OTHER PUBLICATIONS

"Office Action of Taiwan Counterpart Application," dated Feb. 9, 2016, p. 1-p. 9, in which the listed references were cited.

*Primary Examiner* — James R Sheleheda
(74) *Attorney, Agent, or Firm* — JCIPRNET

(57) ABSTRACT

An image depth sensing method adapted to obtain depth information within a field of view by an image depth sensing apparatus is provided. The method includes the following steps: determining whether the field of view includes a distant object with a depth greater than a distance threshold; in response to determining that the field of view does not include the distant object, obtaining the depth information within the field of view according to a general mode; and in response to determining that the field of view includes the distant object, obtaining the depth information within the field of view according to an enhanced mode. A maximum depth which can be detected in the general mode is not greater than the distance threshold, and a maximum depth which can be detected in the enhanced mode is greater than the distance threshold. In addition, an image depth sensing apparatus is also provided.

14 Claims, 6 Drawing Sheets

(51) Int. Cl.
  *H04N 5/232* (2006.01)
  *H04N 13/254* (2018.01)
  *H04N 13/268* (2018.01)

(52) U.S. Cl.
  CPC ........... *H04N 13/25* (2018.05); *H04N 13/254* (2018.05); *H04N 13/268* (2018.05); *G06T 2207/10024* (2013.01)

(56) References Cited

U.S. PATENT DOCUMENTS

| | | | | |
|---|---|---|---|---|
| 9,389,069 | B2* | 7/2016 | Bloom | G01B 11/2527 |
| 9,846,943 | B2* | 12/2017 | Nash | G06K 9/18 |
| 9,947,099 | B2* | 4/2018 | Bleyer | G01B 11/2513 |
| 2009/0128833 | A1* | 5/2009 | Yahav | G01S 17/023 |
| | | | | 356/623 |
| 2015/0215547 | A1* | 7/2015 | Muller | G01J 3/2803 |
| | | | | 348/598 |
| 2015/0281671 | A1* | 10/2015 | Bloom | G01B 11/254 |
| | | | | 348/46 |
| 2015/0341619 | A1* | 11/2015 | Meir | G01S 17/06 |
| | | | | 348/47 |
| 2016/0212411 | A1* | 7/2016 | Lindner | G01C 11/00 |
| 2016/0253812 | A1* | 9/2016 | Grossinger | G01B 11/14 |
| | | | | 356/614 |
| 2016/0275690 | A1* | 9/2016 | Siddiqui | G06T 7/521 |
| 2016/0330434 | A1* | 11/2016 | Chen | G01B 11/2513 |
| 2017/0142312 | A1* | 5/2017 | Dal Mutto | H04N 5/332 |
| 2017/0184704 | A1* | 6/2017 | Yang | G01S 7/4816 |
| 2017/0264884 | A1* | 9/2017 | Chou | H04N 13/128 |
| 2018/0031137 | A1* | 2/2018 | Zabatani | H04N 5/2351 |
| 2018/0048879 | A1* | 2/2018 | Venkataraman | G01P 3/38 |
| 2018/0084240 | A1* | 3/2018 | Campbell | G06T 7/0002 |
| 2018/0203247 | A1* | 7/2018 | Chen | G03B 21/2033 |
| 2018/0321384 | A1* | 11/2018 | Lindner | G01S 17/89 |

FOREIGN PATENT DOCUMENTS

| | | | | |
|---|---|---|---|---|
| TW | | I584634 | 5/2017 | |
| WO | WO-2009063472 | A1 * | 5/2009 | ........... G01S 17/023 |

* cited by examiner

IMAGE DEPTH SENSING METHOD AND IMAGE DEPTH SENSING APPARATUS

CROSS-REFERENCE TO RELATED APPLICATION

This application claims the priority benefit of Taiwan application serial no. 106127125, filed on Aug. 10, 2017. The entirety of the above-mentioned patent application is hereby incorporated by reference herein and made a part of this specification.

BACKGROUND

Field

The invention relates to an image depth sensing method and an image depth sensing apparatus.

Description of Related Art

In recent years, the application of three-dimensional (3D) image capturing device becomes more and more popular. For example, a dual-lens camera is a commonly used 3D image capturing device, which uses a viewing angle difference of two lenses to measure a distance between an object and the camera. Another commonly used technique is, for example, to measure a difference between a time when a laser light is emitted and a time when the laser light is reflected by the object to serve as a time of flight (TOF) of photon, so as to calculate the distance of the object. Moreover, another technique is to use a fixed distance to dispose a light emitting device and a light detecting device. The light emitting device emits a light to the object in an angle of emission, and the light detecting device may detect the light reflected by the object and a reflecting angle thereof. According to the aforementioned angle of emission and the reflecting angle in collaboration with the distance between the two devices, the distance of the object may be calculated according to mathematical principles of triangle. Based on the aforementioned various methods, a distance of a point in a space may be easily measured. However, it has to take a lot of time to measure the distance of the whole area.

Invention of structured light measurement technology decreases a processing time and equipment cost required for measuring the distance of each place in the area. A basic application of the structured light measurement technology is, for example, to sequentially project a plurality of the structured lights with different coding patterns to a specific area in a scanning cycle, and then use the light detecting device to detect reflected patterns corresponding to the structured lights. Based on the different coding patterns and the detected corresponding reflected patterns, a reflecting angle of the reflected light and a projecting angle of the corresponding projected light may be determined, and based on the mathematical principles of triangle, the distances of different places in the area may be deduced.

However, under a design trend of light and slim of the electronic devices, power consumption is one of the most important factors to be considered. Therefore, how to design a mechanism capable of effectively obtaining 3D images in a lower power consumption to prolong a device usage time is one of the targets to be achieved by related technicians of the field.

SUMMARY

The disclosure is directed to an image depth sensing method and an image depth sensing apparatus, by which a power required for sensing an object depth is saved to prolong a device usage time.

The disclosure provides an image depth sensing method, which is adapted to an image depth sensing apparatus for obtaining depth information within a field of view. The method includes following steps: determining whether the field of view includes a distant object with a depth greater than a distance threshold; in response to determining that the field of view does not include the distant object, obtaining the depth information within the field of view according to a general mode; and in response to determining that the field of view includes the distant object, obtaining the depth information within the field of view according to an enhanced mode. A maximum depth that can be detected in the general mode is not greater than the distance threshold, and a maximum depth that can be detected in the enhanced mode is greater than the distance threshold.

The disclosure provides an image depth sensing apparatus including a depth image capturing device and a processing device. The depth image capturing device is configured to capture a light signal image within a field of view. The processing device is coupled to the depth image capturing device, and is configured to obtain depth information within the field of view according to a general mode or an enhanced mode by using the depth image capturing device. A maximum depth that can be detected in the general mode is not greater than a distance threshold, and a maximum depth that can be detected in the enhanced mode is greater than the distance threshold. The processing device determines whether the field of view includes a distant object with a depth greater than the distance threshold, obtains the depth information within the field of view according to the general mode by using the depth image capturing device in response to determining that the field of view does not include the distant object, and obtains the depth information within the field of view according to the enhanced mode by using the depth image capturing device in response to determining that the field of view includes the distant object.

According to the above description, the image depth sensing method and the image depth sensing apparatus of the disclosure provide the general mode and the enhanced mode with different sensing abilities, and determine the mode used for image depth sensing according to the distance of the object within the field of view. In this way, the power is saved to prolong the device usage time.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Embodiments of the invention provide an image depth sensing method and an image depth sensing apparatus using the same. In the provided method, two modes used for sensing an object depth including a general mode and an enhanced mode are provided. Compared to the general mode, the enhanced mode may consume more power, and a maximum object depth that can be detected in the enhanced mode is deeper than a maximum object depth that can be detected in the general mode. Particularly, according to the image depth sensing method of the invention, the enhance mode is switched only when a distant object is detected within the field of view (for example, an object with a distance exceeding the maximum depth that can be detected in the general mode), and otherwise the general mode is maintained to save the power of the device.

Figure 1:
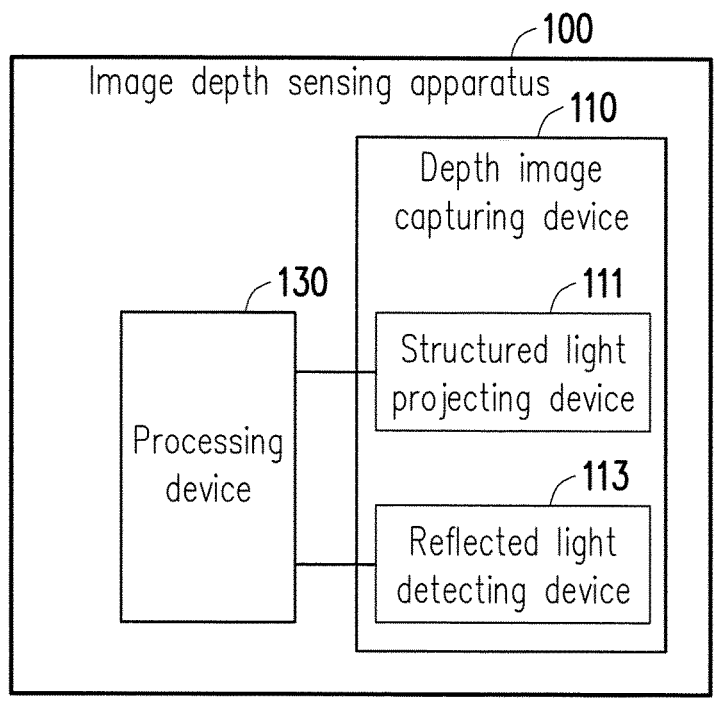
FIG. 1 is a block diagram of an image depth sensing device according to an embodiment of the disclosure.

FIG. 1 is a block diagram of an image depth sensing device according to an embodiment of the disclosure. Referring to FIG. 1, the image depth sensing device 100 includes a depth image capturing device 110 and a processing device 130. The depth image capturing device 110 is configured to capture light signal images within a field of view (FOV). The processing device 130 is coupled to the depth image capturing device 110, and is configured to control the depth image capturing device 110 to capture the light signal images in a general mode or an enhanced mode, and receives the light signal images captured by the depth image capturing device 110, and determines depth information of an object in the FOV according to the received light signal images.

In an embodiment, the image depth sensing device 100 may further include an image capturing device (not shown), which is coupled to the processing device 130. The image capturing device is, for example, a conventional color camera, and is configured to capture a two-dimensional (2D) color image within the FOV. The processing device 130 combines the depth information within the FOV with the 3D color image to obtain a 3D color image.

In the present embodiment, the processing device 130 is, for example, a central processing unit (CPU), or other programmable microprocessor, etc., though the invention is not limited thereto. In an embodiment, the processing device 130 may further include a lens control unit (not shown) configured to control the depth image capturing device 110.

In the present embodiment, the image depth sensing device 100, for example, determines a depth or a distance of an object through a structured light technique, and the depth image capturing device 110 includes a structured light projecting device 111 and a reflected light detecting device 113. However, in other embodiments, the image depth sensing device 100 may also determine the depth or the distance of the object through other techniques such as a viewing angle difference, etc.

The structured light projecting device 111 is coupled to the processing device 130, and is configured to project a plurality of structured lights within the FOV. In an embodiment, the structured lights projected by the structured light projecting device 111 is an invisible light (for example, an infrared light), and the structured light projecting device 111 is configured with a fine-motion structure, and is controlled by the processing device 130 to project structured lights with different coding patterns to the FOV. The detailed structure of the structured light projecting device 111 is not limited by the invention, and those skilled in the art may implement the structured light projecting device 111 of the invention according to an actual requirement.

The reflected light detecting device 113 is coupled to the processing device 130, and is configured to capture a plurality of light signal images corresponding to the structured lights projected by the structured light projecting device 111 within the FOV. In an embodiment, the structured lights projected by the structured light projecting device 111 are invisible lights (for example, infrared lights), and the reflected light detecting device 113 is, for example, an invisible light (for example, infrared light) detector or camera, which is configured to capture images of the reflected structured lights. Similarly, the detailed structure of the reflected light detecting device 113 is not limited by the invention, and those skilled in the art may implement the reflected light detecting device 113 of the invention according to an actual requirement.

Figure 2:
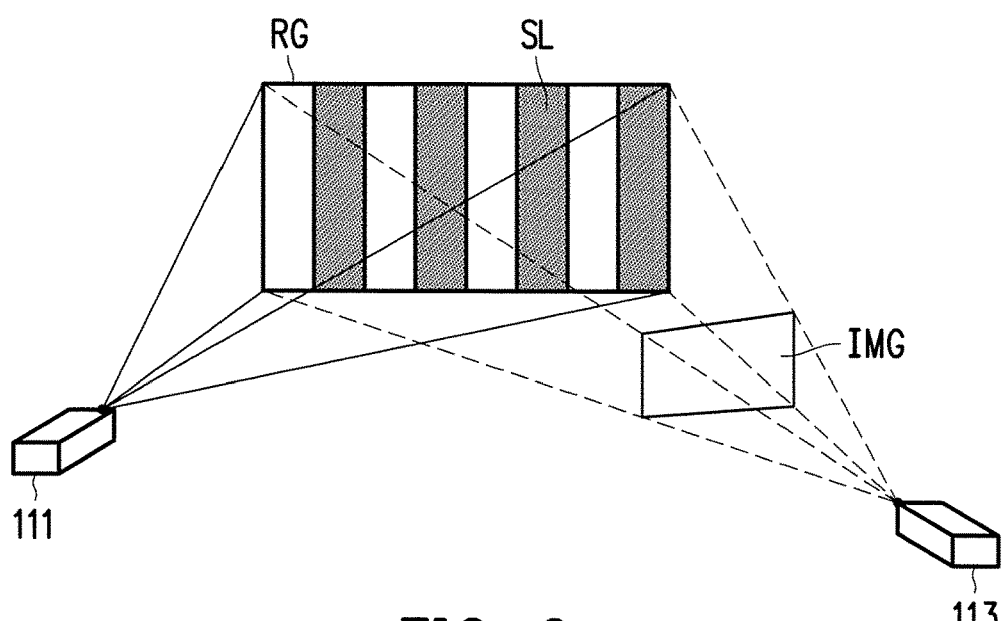
FIG. 2 is a schematic diagram of capturing a light signal image according to an embodiment of the disclosure.

FIG. 2 is a schematic diagram of a captured light signal image according to an embodiment of the disclosure.

Referring to FIG. 2, in an embodiment, the structured light projecting device 111 sequentially projects a plurality of structured lights SL with different coding patterns within the FOV RG in a structured light processing cycle, and the reflected light detecting device 113 sequentially captures a plurality of light signal images IMG corresponding to a plurality of the structured lights SL with different coding patterns. Each of the structured lights SL includes a plurality of scan lines, and the different coding patterns of the structured lights SL are constructed through bright and dark of each of the scan lines.

Figure 3:
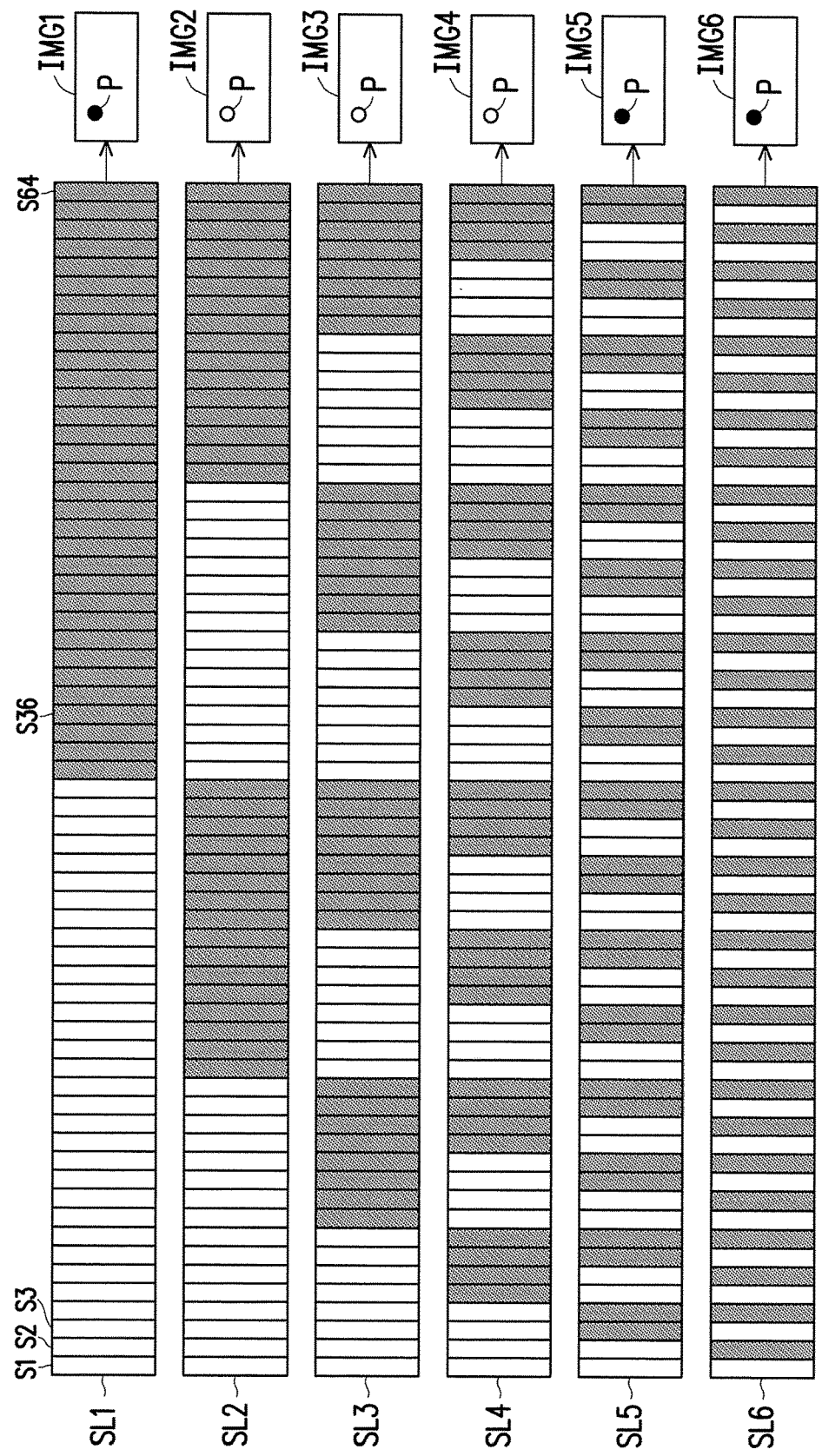
FIG. 3 is a schematic diagram of structured light coding patterns according to an embodiment of the disclosure.

FIG. 3 is a schematic diagram of structured light coding patterns according to an embodiment of the disclosure.

Referring to FIG. 3, a structure light SL1 includes 32 bright scan lines S1 to S32 and 32 dark scan lines S33 to S64, so that the coding pattern of the structured light SL1 can be represented as "11111111111111111111111111111111 0000000000000000 0000000000000000". A structure light SL2 includes 16 bright scan lines S1 to S16, 16 dark scan lines S17 to S32, 16 bright scan lines S33 to S48 and 16 dark scan lines S49 to S64, so the coding pattern of the structured light SL2 can be represented as "1111111111111111 0000000000000000 1111111111111111 0000000000000000". On the other hand, a structured light SL6 includes 64 bright and dark interleaved scan lines S1 to S64, so that coding pattern of the structured light SL6 can be represented as "1010101010101010101010101010101010101010101010101010101010101010", and so on.

It should be noted that for clarity's sake, only the first three scan lines S1 to S3, the 36$^{th}$ scan line S36 and the 64$^{th}$ scan line S64 are indicated in FIG. 3, and the other scan lines S4 to S36, S37 to S63 may be deduced by analogy.

An interval of the scan lines from bright to dark in one structured light is referred to as one spatial period. Therefore, the spatial period of the structured light SL1 is 32 times of the spatial period of the structured light SL6, and the spatial frequency (for example, 32f) of the structured light SL6 is 32 times of the spatial frequency (for example, f) of the structured light SL1. In other words, the spatial frequency of the structured light may represent a number of times that the scan lines of the structured light are switched from bright to dark within the FOV.

Referring to FIG. 2 and FIG. 3, when the structured light projecting device 111 sequentially projects the structured lights SL1 to SL6 with coding patterns of different spatial frequencies (for example, $2^n f$, n=1, 2, 3, 4, 5, 6) within the FOV RG in the structured light processing cycle, and the reflected light detecting device 113 sequentially obtains reflected light signal images IMG1 to IMG6 corresponding to the structured lights SL1 to SL6, the processing device 130 may determine which one of the scan lines is reflected by the object according to the light signal images IMG1 to IMG6. Therefore, within one structured light processing cycle, based on the aforementioned information in collaboration with a position of a reflecting point in the light signal images, the depth of the object corresponding to the reflecting point may be calculated.

For example, the reflecting point is detected at a certain pixel position P in the light signal images IMG2, IMG3 and IMG4, and the reflecting point is not detected at the same pixel position in the light signal images IMG1, IMG5 and IMG6. Since the $36^{th}$ scan lines of the structured lights SL2, SL3 and SL4 are bright scan lines, and the $36^{th}$ scan lines of the structured lights SL1, SL5 and SL6 are dark scan lines, it is deduced that the $36^{th}$ scan line S36 is reflected by the object. A projecting angle may be deduced from the $36^{th}$ scan line, and a reflecting angle may be deduced from the pixel position P, and in collaboration with a known distance between the structured light projecting device 111 and the reflected light detecting device 113, a depth of the pixel position P may be calculated. In this way, after the depths of every pixel positions within the FOV are calculated, the depth information within the FOV is calculated.

In an embodiment of the invention, the processing device 130 may further control the structured light projecting device 111 to project the structured lights of different intensities. For example, in the general mode, the structured light projecting device 111 projects the structured light of a first intensity, and in the enhanced mode, the structured light projecting device 111 projects the structured light of a second intensity greater than the first intensity. Therefore, a maximum depth that can be detected in the enhanced mode is deeper than a maximum depth that can be detected in the general mode.

In an embodiment of the invention, the processing device 130 may further control the reflected light detecting device 113 to amplify a light current using different amplification factors, so as to capture the light signal image. For example, in the general mode, the reflected light detecting device 113 amplifies the light current using a first amplification factor, and in the enhanced mode, the reflected light detecting device 113 amplifies the light current using a second amplification factor greater than the first amplification factor. Therefore, in the enhanced mode, a light sensitivity in the enhanced mode is higher than a light sensitivity in the general mode, and the maximum depth that can be detected in the enhanced mode is deeper than the maximum depth that can be detected in the general mode.

In an embodiment of the invention, the processing device 130 may simultaneously control the structured light projecting device 111 and the reflected light detecting device 113. In the general mode, the structured light projecting device 111 sequentially projects a plurality of structured lights of the first intensity within the FOV, and the reflected light detecting device 113 captures a plurality of first light signal images of the FOV using the first amplification factor. In the enhanced mode, the structured light projecting device 111 sequentially projects a plurality of structured lights of the second intensity within the FOV, and the reflected light detecting device 113 captures a plurality of second light signal images of the FOV using the second amplification factor.

The processing device 130 analyzes the obtained light signal images (for example, the first light signal images or the second light signal images) to obtain the depth information in the FOV according to the aforementioned method.

Figure 4:
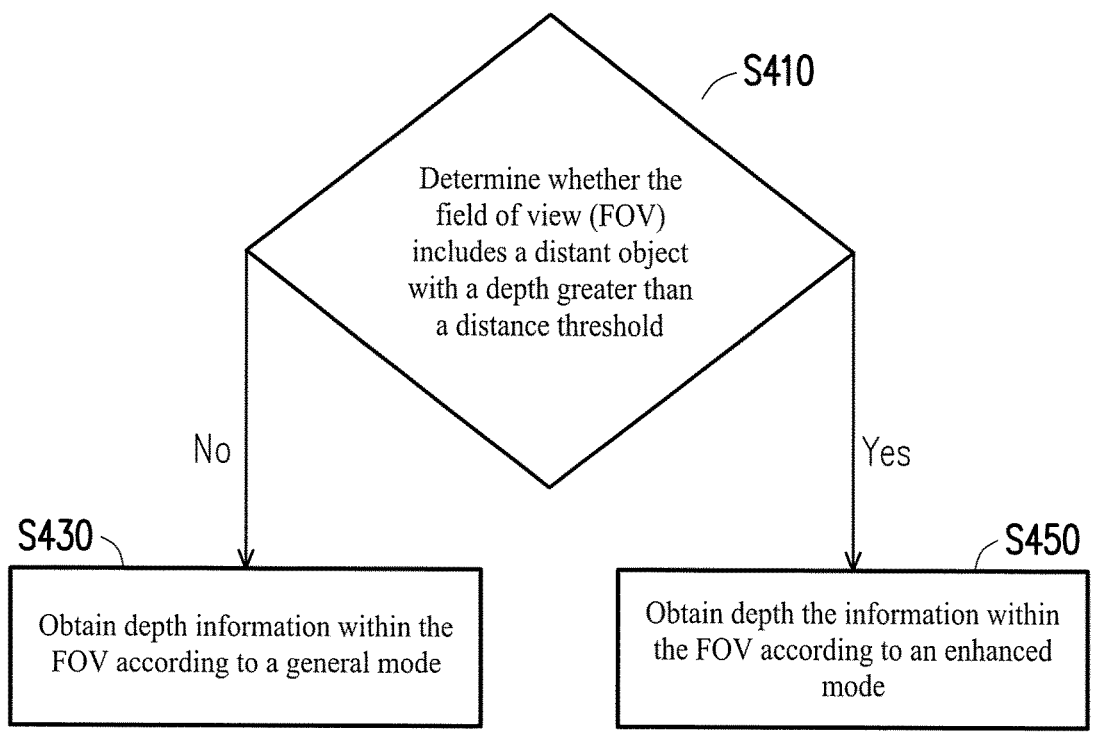
FIG. 4 is a flowchart illustrating an image depth sensing method according to an embodiment of the disclosure.

FIG. 4 is a flowchart illustrating an image depth sensing method according to an embodiment of the disclosure. The image depth sensing method is adapted to the image depth sensing apparatus 100 of the embodiment of FIG. 1, and the image depth sensing method of the present embodiment is described in detail below with reference of various components of the image depth sensing apparatus 100.

First of all, the processing device 130 determines whether the FOV of the image depth sensing apparatus 100 includes a distant object with a depth greater than a distance threshold (S410). In the present embodiment, the distance threshold is predetermined as the maximum depth that can be detected in the general mode, though the invention is not limited thereto.

If the FOV does not include the distant object, it represents that a detecting ability of the general mode is enough to detect all object depths in the FOV. Therefore, the processing device 130 obtains the depth information within the FOV according to the general mode by using the depth image capturing device 110 in response to determining that the FOV does not include the distant object (S430).

If the FOV includes the distant object, it represents that the detecting ability of the general mode is not enough to detect all object depths in the FOV. Therefore, the processing device 130 obtains the depth info nation within the FOV according to the enhanced mode by using the depth image capturing device 110 in response to determining that the FOV includes the distant object (S450).

The detailed method for obtaining the depth information within the FOV according to the general mode and the enhanced mode has been described in the aforementioned embodiment, and those skilled in the art may implement the same according to the embodiment of the invention, and detail thereof is not repeated.

Embodiments are provided below to describe how the processing device 130 of the embodiment of the invention determines whether the FOV includes the distance object.

Figure 5:
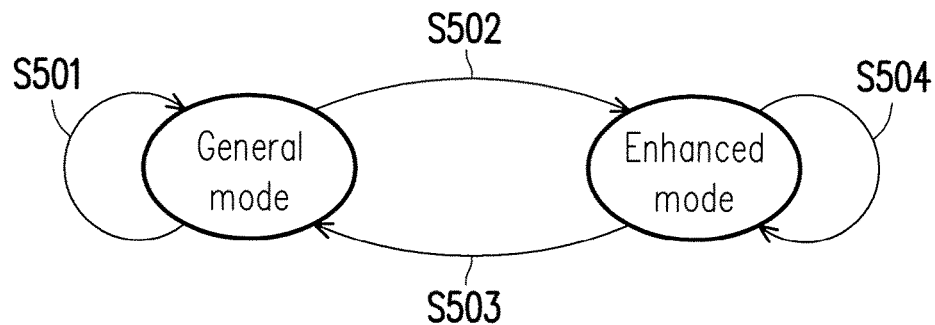
FIG. 5 is a schematic diagram of an image depth sensing method according to an embodiment of the disclosure.

FIG. 5 is a schematic diagram of an image depth sensing method according to an embodiment of the disclosure. In an embodiment, the processing device 130 may obtain the depth information in the FOV according to the enhanced mode by using the depth image capturing device 110, and continue to compare the obtained depth information with the distance threshold, so as to determine whether the FOV includes the distant object with the depth greater than the distance threshold.

Referring to FIG. 5, the processing device 130 may execute N structured light processing cycles in the general mode to obtain the depth information within the FOV (S501), and is switched to the enhanced mode to obtain the depth information within the FOV in the $(N+1)^{th}$ structured light processing cycle (S502), so as to determine whether the FOV includes the distant object with the depth greater than the distance threshold. If the processing device 130 determines that the FOV includes the distant object, the processing device 130 switches to the enhanced mode. Conversely, the processing device 130 switches back to the general mode.

On the other hand, in the enhanced mode, if the processing device 130 keeps determining that the FOV does not include the distant object in M structured light processing cycles, the processing device 130 switches back to the general mode to obtain the depth information (S503). Conversely, the processing device 130 maintains in the enhanced mode (S504).

In the present embodiment, by determining whether the FOV includes the distant object every specific period (for example, N structured light processing cycles), the number of times for determination and power consumption are saved. It should be noted that M, N are positive integers, and the actual values of M and N are not limited by the invention.

Figure 6:
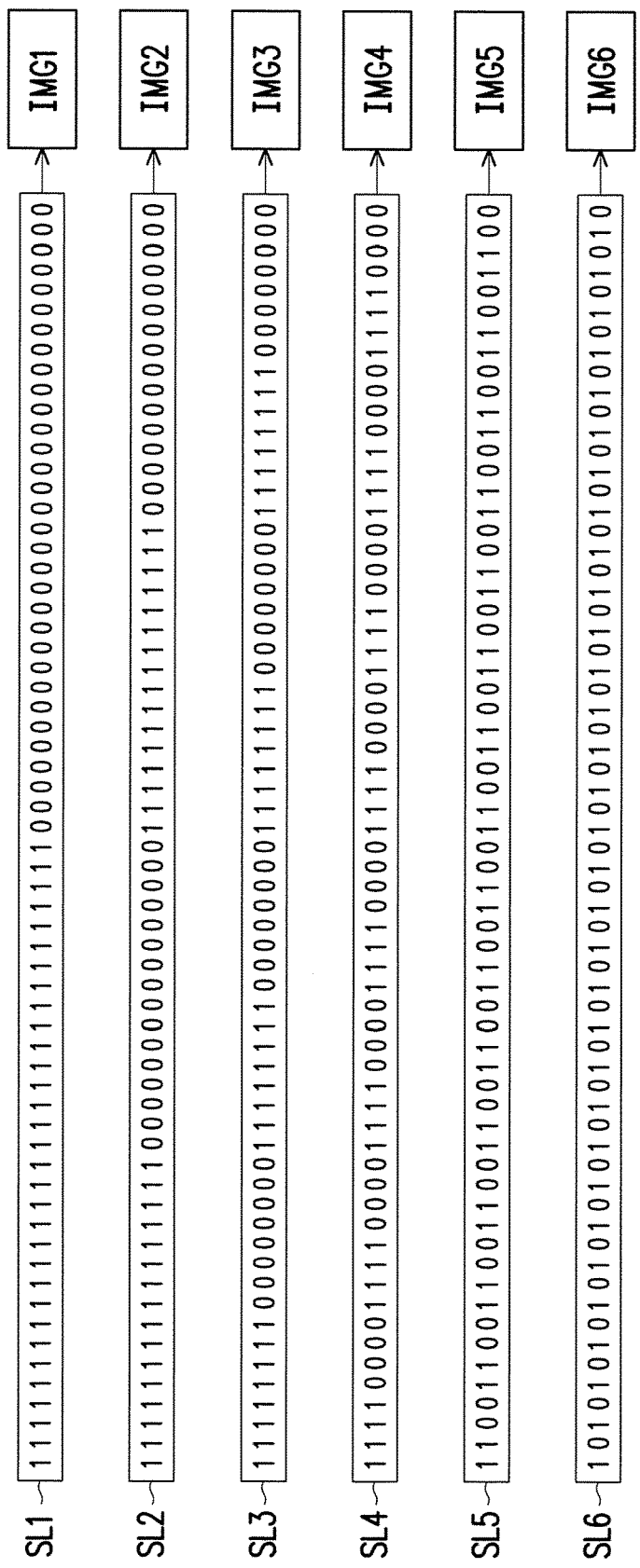
FIG. 6 is a schematic diagram of an image depth sensing method according to another embodiment of the disclosure.

FIG. 6 is a schematic diagram of an image depth sensing method according to another embodiment of the disclosure. In an embodiment, the processing device 130 uses a plurality of structured lights of different intensities to determine whether the FOV includes the distant object in one structured light processing cycle.

Referring to FIG. 6, the processing device 130 respectively projects six structured lights SL1 to SL6 with different coding patterns of different spatial frequencies (for example, f, 2f, 4f, 8f, 16f and 32f) in one structured light processing cycle.

In the present embodiment, the processing device 130, for example, projects the structured lights SL1 to SL5 (the first structured lights) of the first intensity, and obtains the corresponding first images IMG1 to IMG5, and projects the structured light SL6 (the second structured light) of the second intensity, and obtains the corresponding second image IMG6. If only the second image IMG6 has the reflecting point at a certain pixel position, and the first images IMG1 to IMG5 do not have the reflecting point at the certain pixel position, it represents that the reflecting point appeared at the certain pixel position is coming from the reflection of a distant object. Therefore, the processing device 130 determines that the FOV includes the distant object and then obtains the depth information within the FOV in the enhanced mode.

It should be noted that since the 63$^{rd}$ scan line is a dark scan line in each of the structured lights SL1 to SL5, and is a bright scan line in the structured light SL6, in order to avoid confusion, the processing device 130 of the present embodiment may not use the coded 63$^{rd}$ scan line.

Similar to the embodiment of FIG. 5, in an embodiment, after the processing device 130 executes the N structured light processing cycles in the general mode or the enhanced mode to obtain the depth information within the FOV, the processing device 130 may execute the method of the embodiment of FIG. 6 at the (N+1)$^{th}$ structured light processing cycle to determine whether the FOV includes the distant object.

On the other hand, in an embodiment, the processing device 130 may project the structured lights SL1 to SL5 (the first structured lights) of the second intensity in the enhanced mode and obtain the corresponding first images IMG1 to IMG5, and project the structured light SL6 (the second structured light) of the first intensity and obtain the corresponding second image IMG6. If the reflecting points ever appeared in the first images IMG1 to IMG5 all appear in the second image IMG6, the processing device 130 determines that the FOV does not include the distant object. When the processing device 130 keeps determining that the FOV does not include the distant object in M structured light processing cycles, the processing device 130 switches back to the general mode. Otherwise, the processing device 130 maintains in the enhanced mode.

It should be noted that in some cases of the aforementioned embodiment, when the reflecting points ever appeared in the first images IMG1 to IMG5 do not appear in the second image IMG6, the FOV probably does not include the distant object. For example, when the reflecting point ever appeared in the first images IMG1 to IMG5 is just located at an even numbered scan line (i.e. the dark scan line of the structured light SL6), the reflecting point may not necessarily come from the distant object, which causes that the processing unit 130 fails to make a correct determination. In order to enhance correctness of the determination to further save power, the processing unit 130 may replace all of the dark scan lines of the structured light SL6 by the bright scan lines, i.e. to use the first intensity to project the structured light SL6 with 64 bright scan lines. In this way, the correctness of "determining that the FOV does not include the distant object if the reflecting points ever appeared in the first images IMG1 to IMG5 all appear in the second image IMG6" is improved.

Compared to the embodiment of FIG. 5, in the present embodiment, when it is determined whether the distance object exists, it is unnecessary to keep projecting a high intensity structured light within one structured light processing cycle, so that more power is saved.

Figure 7:
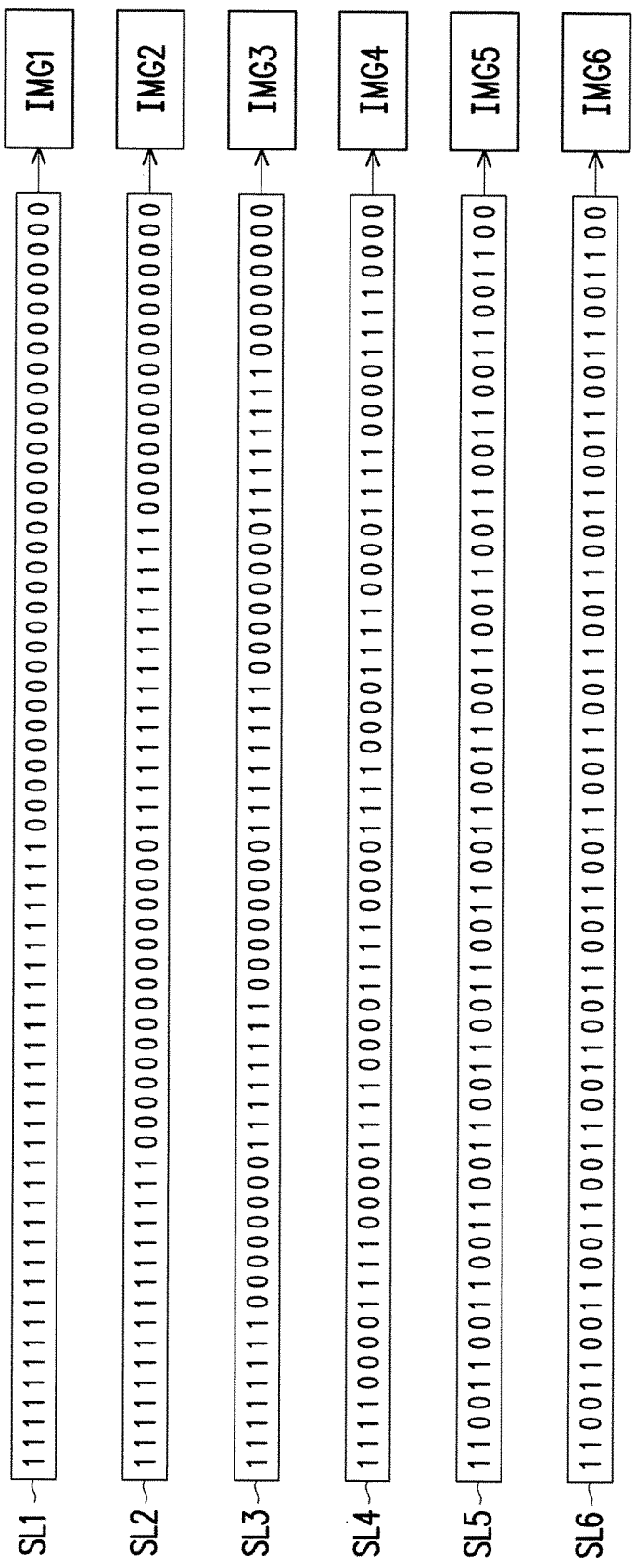
FIG. 7 is a schematic diagram of an image depth sensing method according to another embodiment of the disclosure.

FIG. 7 is a schematic diagram of an image depth sensing method according to another embodiment of the disclosure. A difference between the present embodiment and the embodiment of FIG. 6 is that the spatial frequency of the structured light SL6 of the present embodiment is the same with the spatial frequency of the structured light SL5.

Referring to FIG. 7, the processing device 130 respectively projects six structured lights SL1 to SL6 with spatial frequencies of f, 2f, 4f, 8f, 16f and 16f within one structured light processing cycle, where the coding patterns of the structure light SL5 and SL6 are the same.

In the present embodiment, the processing device 130, for example, projects the structured lights SL1 to SL5 (the first structured lights) of the first intensity and obtains the corresponding first images IMG1 to IMG5, and projects the structured light SL6 (the second structured light) of the second intensity and obtains the corresponding second image IMG6.

In the present embodiment, the processing device 130 only requires to compare whether the second image IMG6 has the reflecting point that is not appeared in the first image IMG5, and may determine whether the FOV includes the distant object. When the second image IMG6 has the reflecting point that is not appeared in the first image IMG5, the processing device 130 may determine that the FOV includes the distant object, and obtains the depth information within the FOV in the enhanced mode.

On the other hand, the processing device 130, for example, projects the structured lights SL1 to SL5 (the first structured lights) of the second intensity and obtains the corresponding first images IMG1 to IMG5, and projects the structured light SL6 (the second structured light) of the first intensity and obtains the corresponding second image IMG6. The processing device 130 only requires to compare whether the first image IMG5 has the reflecting point that is not appeared in the second image IMG6, and may determine whether the FOV includes the distant object. When the first image IMG5 has the reflecting point that is not appeared in the second image IMG6, the processing device 130 determines that the FOV includes the distant object, otherwise, the processing device 130 determines that the FOV does not include the distant object.

Particularly, compared to the embodiment of FIG. 6, the processing device 130 of the present embodiment only requires to compare two images, so that it may determine whether the FOV includes the distant object with less consumption of computation resource.

Similar to the embodiment of FIG. 5, in an embodiment, after the processing device 130 executes N structured light processing cycles in the general mode or the enhanced mode to obtain the depth information within the FOV, the processing device 130 may execute the method of the embodiment of FIG. 7 at the $(N+1)^{th}$ structured light processing cycle to determine whether the FOV includes the distant object.

Figure 8:
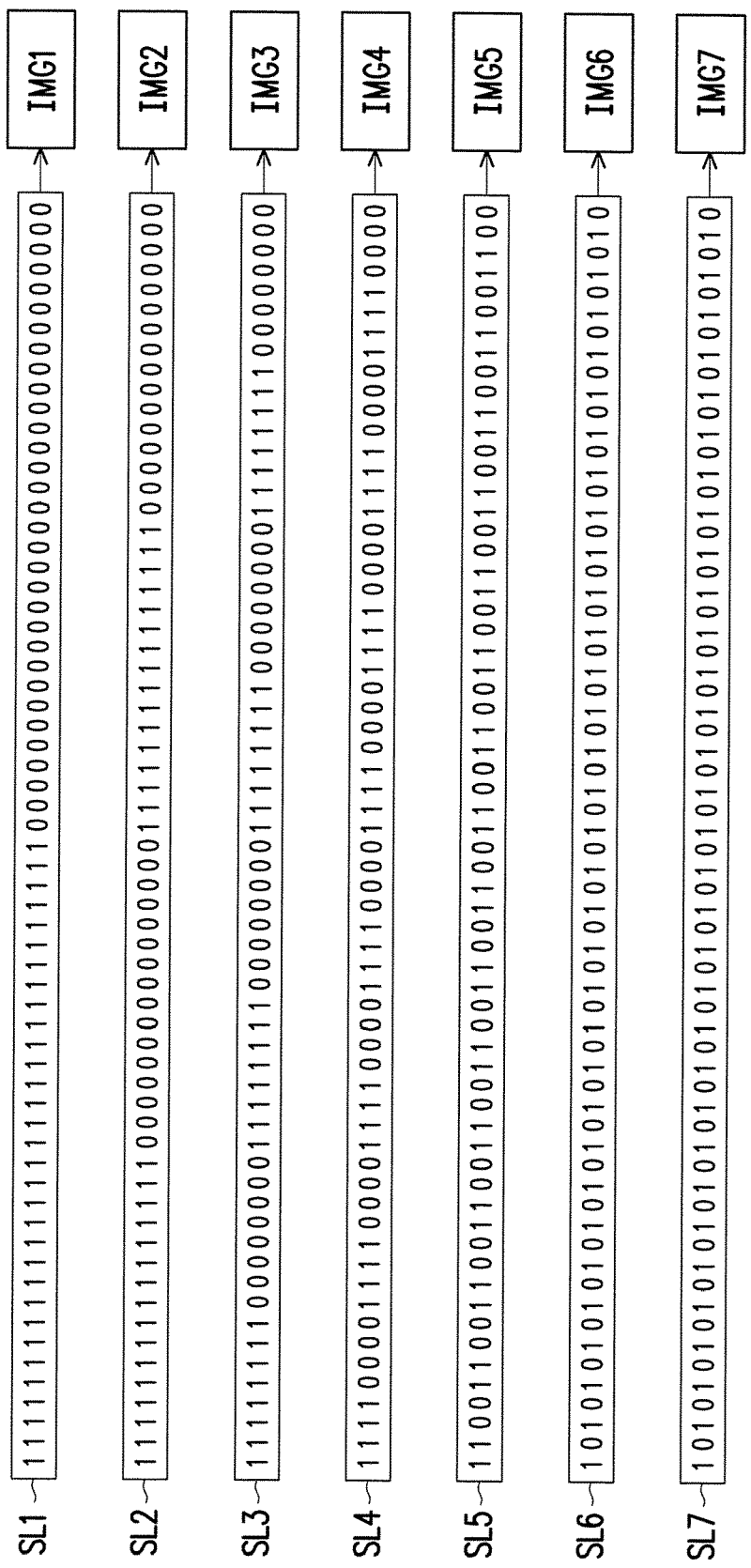
FIG. 8 is a schematic diagram of an image depth sensing method according to still another embodiment of the disclosure.

FIG. 8 is a schematic diagram of an image depth sensing method according to still another embodiment of the disclosure. A difference between the present embodiment and the embodiment of FIG. 7 is that in the embodiment of FIG. 7, the spatial frequency and the coding pattern of the structure light SL6 are changed to be the same as the spatial frequency and the coding pattern of the structure light SL5 for determining the distant object, and in the present embodiment, when it is to determine whether the FOV includes the distant object, a structured light SL7 with a coding pattern which is the same as that of the structure light SL6 is additionally added into the structured light processing cycle for determining the distant object.

Referring to FIG. 8, the processing device 130 respectively projects six structured lights SL1 to SL6 with spatial frequencies of f, 2f, 4f, 8f, 16f and 32f within one structured light processing cycle, and additionally projects the structured light SL7 with the coding pattern which is the same as that of the structure light SL6.

Similarly, in the present embodiment, the processing device 130, for example, projects the structured lights SL1 to SL6 (the first structured lights) of the first intensity and obtains the corresponding first images IMG1 to IMG6, and projects the structured light SL7 (the second structured light) of the second intensity and obtains the corresponding second image IMG7.

In the present embodiment, the processing device 130 only requires to compare whether the second image IMG7 has the reflecting point that is not appeared in the first image IMG6, and may determine whether the FOV includes the distant object. When the second image IMG7 has the reflecting point that is not appeared in the first image IMG6, the processing device 130 may determine that the FOV includes the distant object, and obtains the depth information within the FOV in the enhanced mode.

On the other hand, the processing device 130, for example, projects the structured lights SL1 to SL6 (the first structured lights) of the second intensity and obtains the corresponding first images IMG1 to IMG6, and projects the structured light SL7 (the second structured light) of the first intensity and obtains the corresponding second image IMG7. The processing device 130 only requires to compare whether the first image IMG6 has the reflecting point that is not appeared in the second image IMG7, and may determine whether the FOV includes the distant object. When the first image IMG6 has the reflecting point that is not appeared in the second image IMG7, the processing device 130 determines that the FOV includes the distant object, otherwise, the processing device 130 determines that the FOV does not include the distant object.

Particularly, compared to the embodiment of FIG. 7, by only comparing two images, whether the FOV includes the distant object can be determined with less consumption of computation resource and without sacrificing resolution in the present embodiment.

Similar to the embodiment of FIG. 5, in an embodiment, after the processing device 130 executes N structured light processing cycles in the general mode or the enhanced mode to obtain the depth information within the FOV, the processing device 130 may execute the method of the embodiment of FIG. 8 at the $(N+1)^{th}$ structured light processing cycle to determine whether the FOV includes the distant object.

In an embodiment, the image depth sensing apparatus 100 further includes an input device (not shown) coupled to the processing device 130. The input device is configured to receive an input signal to select a region of interest (ROI) in the FOV. The processing device 130 only determines whether the ROI includes the distant object.

For example, the ROI is a region covered by the $10^{th}$ to $20^{th}$ scan lines in the FOV. When the processing device 130 determines whether the ROI includes the distant object, the processing device 130, for example, only use the second intensity to project the $10^{th}$ to $20^{th}$ scan lines, and maintains the first intensity to project the $1^{st}$ to $9^{th}$ scan lines and the $21^{st}$-$64^{th}$ scan lines. In this way, besides the power required for projecting the structured lights is decreased, a computation burden of the processing device 130 is also decreased.

It should be noted that the aforementioned embodiments of the invention all take 64 scan lines as an example for description, so that it is only required to project 6 structured lights with different spatial frequencies to calculate the depth information within the FOV. However, the invention is not limited thereto, and in other embodiments, 10 structured lights with different spatial frequencies may be projected within the structured light processing cycle and each structured light includes 1024 scan lines, or 11 structured lights with different spatial frequencies may be projected within the structured light processing cycle and each structure light includes 2048 scan lines, so as to achieve a higher resolution.

In summary, besides the image depth sensing method and the image depth sensing apparatus of the invention, the embodiments of the invention further provide more methods for determining whether the FOV includes the distant object, so as to determine to use the general mode or the enhanced mode, which not only saves the device power, but also decreases a computation burden.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An image depth sensing method, adapted to an image depth sensing apparatus for obtaining depth information within a field of view, the image depth sensing method comprising:
   determining whether the field of view comprises a distant object to obtain a determination result, comprising:
      within one structured light processing cycle, sequentially projecting a plurality of first structured lights of one of a first intensity and a second intensity within different code patterns and one second structured light of the other one of the first intensity and the second intensity within the field of view;

obtaining a plurality of first light signal images and one second light signal image by capturing each of the first light signal images for one of the first structured lights and capturing the second light signal image for the second structured light; and determining whether the field of view comprises the distant object according to the first light signal images and the second light signal image; and selectively operating in a general mode or an enhanced mode for obtaining the depth information in the field of view according to the determination result, comprising:

in response to the determination result indicating that the field of view does not comprise the distant object, the image depth sensing apparatus operates in the general mode to:

within one structured light processing cycle, sequentially project a plurality of third structured lights of the first intensity with different coding patterns within the field of view;

obtain a plurality of third light signal images by capturing each of the third light signal images for one of the third structure lights using a first amplification factor; and analyze the third light signal images to obtain the depth information within the field of view; and in response to the determination result indicating that the field of view comprises the distant object, the image depth sensing apparatus operates in the enhanced mode to:

within one structured light processing cycle, sequentially project a plurality of fourth structured lights of the second intensity with different coding patterns within the field of view;

obtain a plurality of fourth light signal images by capturing each of the fourth light signal images for one of the fourth structure lights using a second amplification factor; and analyze the fourth light signal images to obtain the depth information within the field of view, wherein a maximum depth that can be detected in the general mode is less than a maximum depth that can be detected in the enhanced mode.

2. The image depth sensing method as claimed in claim 1, wherein the second intensity is greater than the first intensity.

3. The image depth sensing method as claimed in claim 1, wherein the second amplification factor is greater than the first amplification factor.

4. The image depth sensing method as claimed in claim 1, wherein determining whether the field of view comprises the distant object comprises:

operating in the general mode to obtain the depth information within the field of view according to the general mode; and determining whether the field of view comprises the distant object every N structured light processing cycles, wherein N is a positive integer.

5. The image depth sensing method as claimed in claim 1, wherein spatial frequencies of the first structured lights and the second structured light are different from each other.

6. The image depth sensing method as claimed in claim 5, wherein the spatial frequency of the second structured light is higher than the spatial frequency of each of the first structured lights.

7. The image depth sensing method as claimed in claim 1, wherein a spatial frequency of one of the first structured lights is the same as a spatial frequency of the second structured light.

8. An image depth sensing apparatus, comprising:

a depth image capturing device, configured to capture a light signal image within a field of view, comprising:

a structured light projecting device, configured to project a plurality of structured lights within the field of view; and a reflected light detecting device, configured to capture a plurality of light signal images corresponding to the structured lights within the field of view; and a processing device, coupled to the depth image capturing device, and configured to operate in a general mode or an enhanced mode to obtain depth information within the field of view by using the depth image capturing device, wherein a maximum depth that can be detected in the general mode is less than a maximum depth that can be detected in the enhanced mode, wherein the processing device determines whether the field of view comprises a distant object to obtain a determination result, comprising:

within one structured light processing cycle, sequentially projecting a plurality of first structured lights of one of a first intensity and a second intensity within different code patterns and one second structured light of the other one of the first intensity and the second intensity within the field of view by using the structured light projecting device;

obtaining a plurality of first light signal images and one second light signal image by capturing each of the first light signal images for one of the first structured lights and capturing the second light signal image for the second structured light by using the reflected light detecting device; and determining whether the field of view comprises the distant object according to the first light signal images and the second light signal image, wherein the processing device selectively operates in the general mode or the enhanced mode for obtaining the depth information in the field of view according to the determination result, comprising:

in response to the determination result indicating that the field of view does not comprise the distant object, the processing device operates in the general mode to:

within one structured light processing cycle, sequentially project a plurality of third structured lights of the first intensity with different coding patterns within the field of view by using the structured light projecting device;

obtain a plurality of third light signal images by capturing each of the third light signal images for one of the third structure lights using a first amplification factor by using the reflected light detecting device; and analyze the third light signal images to obtain the depth information within the field of view; and in response to the determination result indicating that the field of view comprises the distant object, the processing device operates in the enhanced mode to:

within one structured light processing cycle, sequentially project a plurality of fourth structured lights of the second intensity with different coding patterns within the field of view by using the structured light projecting device;

obtain a plurality of fourth light signal images by capturing each of the fourth light signal images for one of the fourth structure lights using a second amplification factor by using the reflected light detecting device; and analyze the fourth light signal images to obtain the depth information within the field of view.

9. The image depth sensing apparatus as claimed in claim 8, wherein the second intensity is greater than the first intensity.

10. The image depth sensing apparatus as claimed in claim 8, wherein the second amplification factor is greater than the first amplification factor.

11. The image depth sensing apparatus as claimed in claim 8, wherein the processing device operates in the general mode to obtain the depth information within the field of view, and determines whether the field of view comprises the distant object every N structured light processing cycles, wherein N is a positive integer.

12. The image depth sensing apparatus as claimed in claim 8, wherein spatial frequencies of the first structured lights and the second structured light are different from each other.

13. The image depth sensing apparatus as claimed in claim 12, wherein the spatial frequency of the second structured light is higher than the spatial frequency of each of the first structured lights.

14. The image depth sensing apparatus as claimed in claim 8, wherein a spatial frequency of one of the first structured lights is the same as a spatial frequency of the second structured light.

* * * * *